INVENTORS
DONALD J. WHEELER
VICTOR LOHRENZ
BY Oberlin, Maky & Donnelly
ATTORNEYS

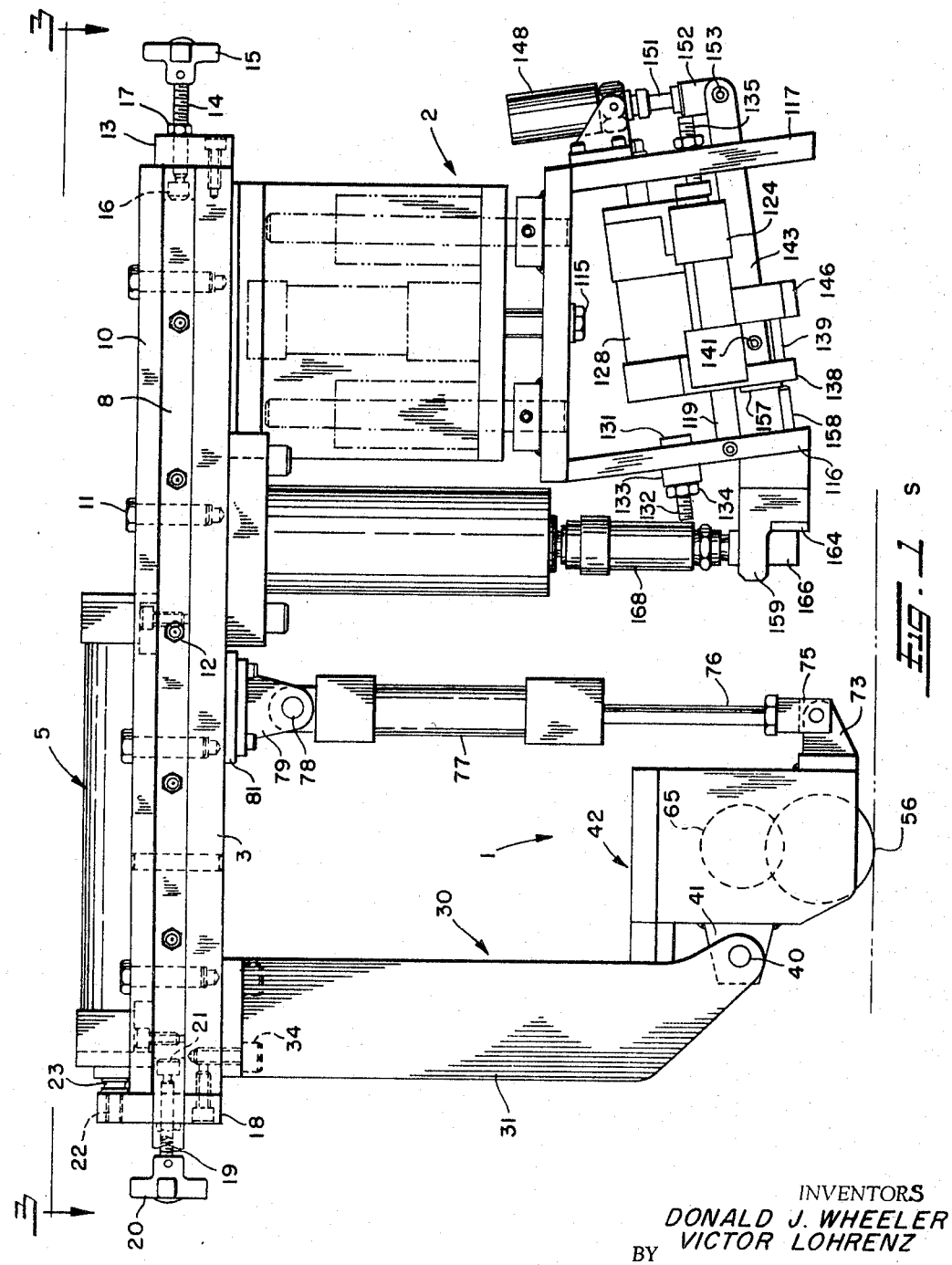

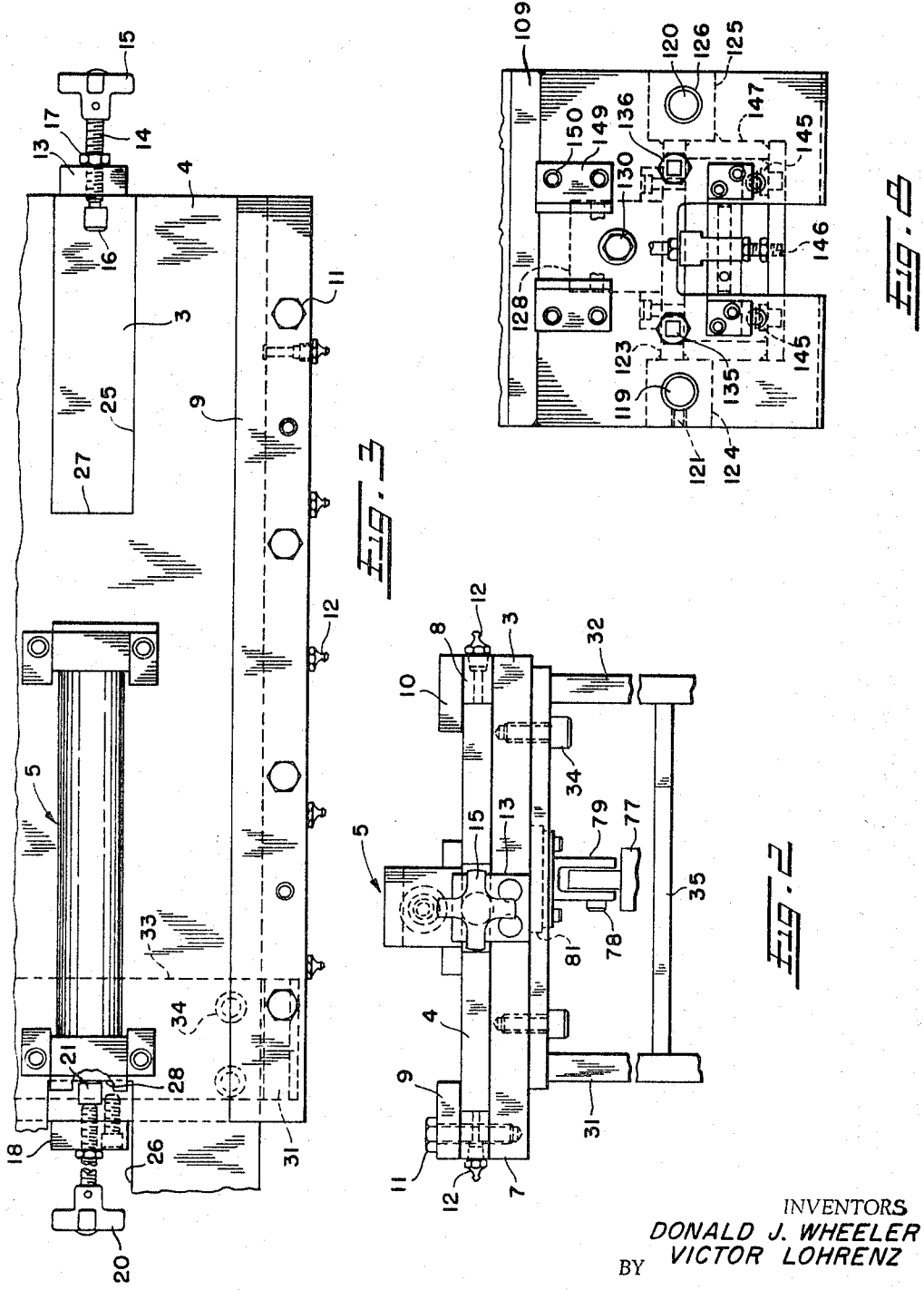

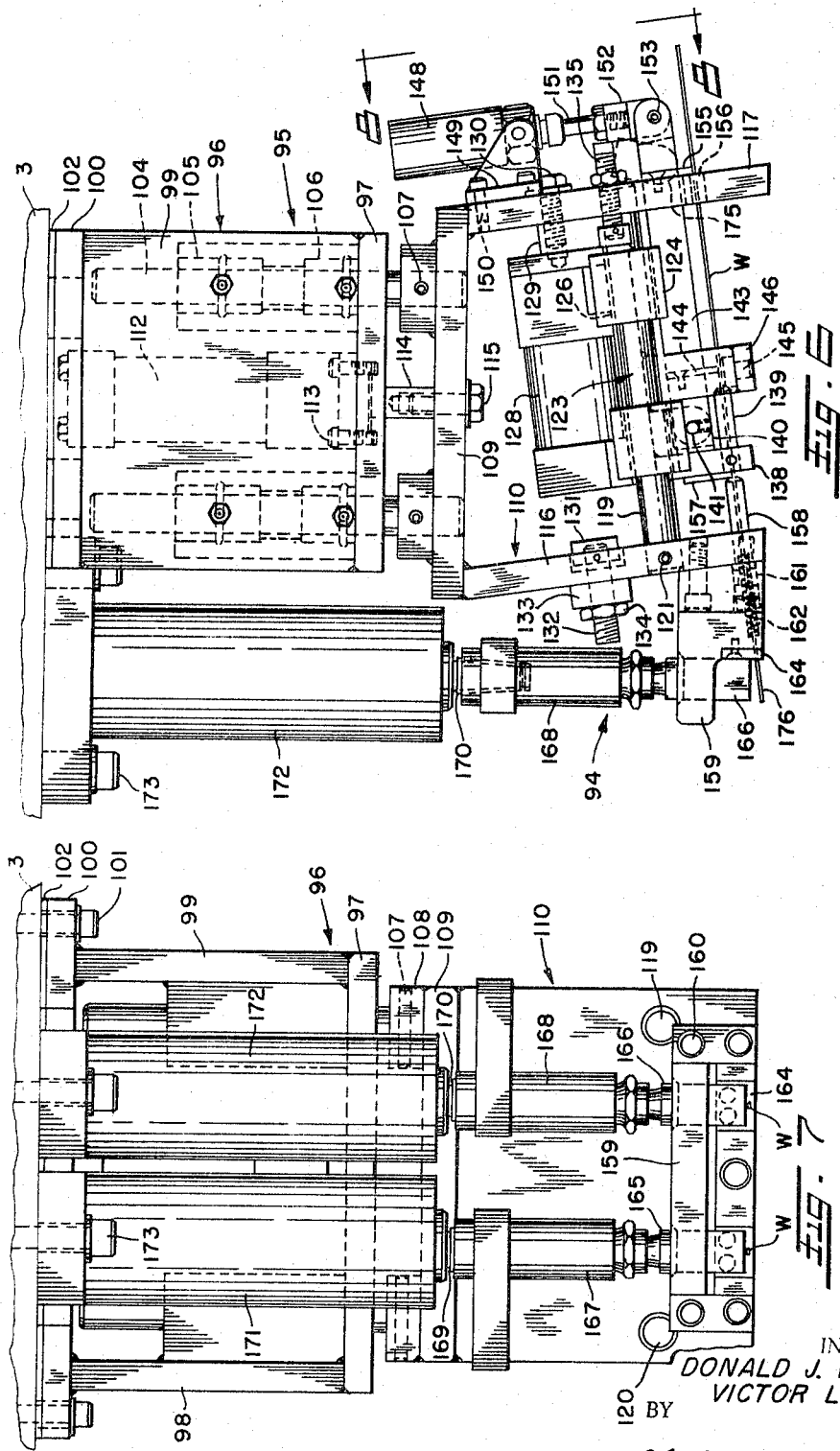

United States Patent Office 3,431,386
Patented Mar. 4, 1969

3,431,386
METHOD AND APPARATUS FOR JOINING STRIP MATERIAL
Donald J. Wheeler, Kent, and Victor Lohrenz, Bedford, Ohio, assignors to Guild Metal Joining Equipment Company, Bedford, Ohio, a corporation of Ohio
Filed Mar. 9, 1965, Ser. No. 438,313
U.S. Cl. 219—78   14 Claims
Int. Cl. B23k 11/00, 11/02, 9/02

ABSTRACT OF THE DISCLOSURE

A method and apparatus for joining two metal strips by cutting a pair of grooves extending from one strip to the other and feeding wires into the grooves, which wires are welded in place by a pair of electrodes and simultaneously severed to substantially the length of the grooves.

---

This invention relates generally as indicated to a method and apparatus for joining strip material and more particularly to certain improvements in the process and machine disclosed in applicant's copending application, Ser. No. 318,354 entitled "Method and Apparatus for Joining Strip Material," filed Oct. 23, 1963, now patent No. 3,334,211, dated Aug. 1, 1967.

In such prior copending application, there is disclosed a process and machine for producing quickly and economically a high strength strip joint wherein aligned grooves are forged in the strip ends to be joined and a stitch wire is then placed therein and directly welded and mashed to the strip ends. In such forging process, it is sometimes difficult to control accurately the groove depth and configuration. Also, the forging of the grooves may affect current flow in the subsequent welding operation depending upon the types of and condition of the material being joined.

It has been found that by machining the grooves in the strip ends, the depth and configuration can closely be controlled and moreover series welding instead of direct welding may effectively be employed. Since the current path is between two machined grooves, current flow will not be affected by surface conditions. Painted, galvanized, hot rolled, full scaly, coated and irregular surface materials can then be welded without undesirable overthickness. Furthermore, in series welding, the transformer may be connected to both sides of the electrode reducing throat depth and therefore the heat used will be the same for the entire width of the material being joined. This, of course, is distinguished from direct welding wherein the amount of heat at the weld may vary due to the added impedance caused by additional metal in the throat of the machine.

It is accordingly a principal object of the present invention to provide certain improvements in the method and apparatus for joining strip material disclosed in the aforementioned copending application.

It is a further principal object to provide apparatus for joining strip material wherein stitch receiving grooves of a controlled depth and configuration can readily be placed in the ends of the material to be joined.

Another object is the provision of apparatus for joining strip material wherein stitches may effectively be series welded to the ends of the material to be joined.

Still another object is the provision of a method for joining strip material which comprises the steps of accurately machining aligned grooves in the ends of the material to be joined and thereafter series welding stitch within such grooves.

Yet another object is the provision of a method and apparatus for joining strip materials by stitch welding wherein coated and irregular surfaced materials can be welded without increasing the thickness of the material.

A further object is the provision of an improved wire feed and severing mechanism wherein the wires are pregrooved as they are fed beneath the electrodes.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 1 is a side elevation of apparatus in accordance with the present invention for joining strip material;

FIG. 2 is a fragmentary end elevation of the apparatus as seen from the left in FIG. 2;

FIG. 3 is a fragmentary top plan view of the apparatus shown in FIG. 1 as seen from the line 3—3 therein;

FIG. 6 is a detail side elevation of the stitch wire feed and welding assembly of the illustrated embodiment;

FIG. 7 is an end elevation of the assembly shown in FIG. 6 as seen from the left thereof; and FIG. 8 is an end elevation of the assembly shown in FIG. 6 as seen from the line 8—8.

Figure 4:
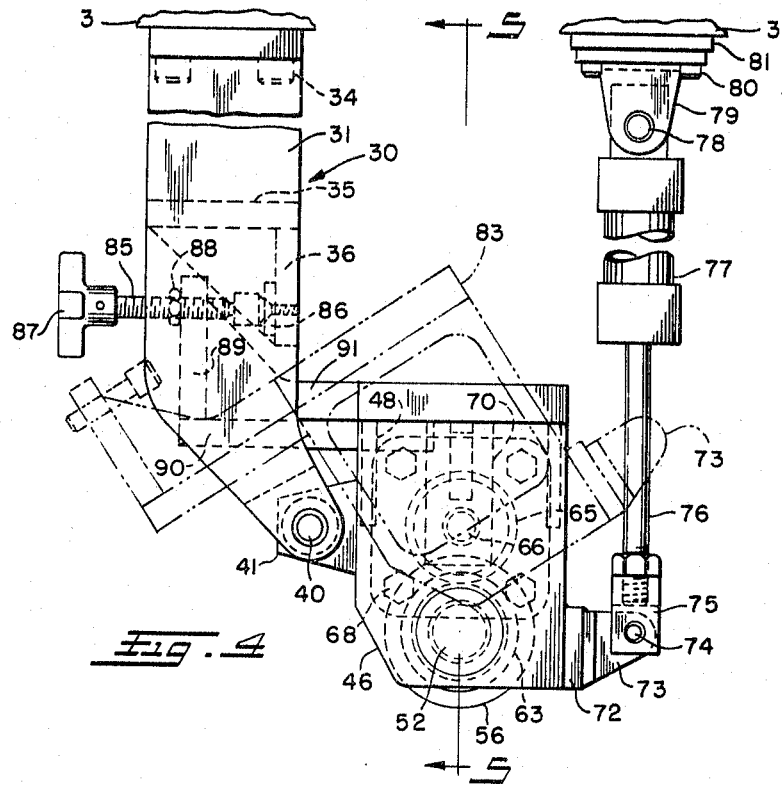
FIG. 4 is an enlarged side elevation of the groove forming cutter assembly of the present invention.

Referring first to FIGS. 1 through 3, it will be seen that the strip joining machine comprises a groove cutter assembly shown generally at 1, and a wire feed and welding assembly shown generally at 2, which are both mounted on a common base 3 in turn mounted for movement on slide 4 by means of hydraulic piston-cylinder assembly 5.

On each side of the base 3, there is provided slide bars 7 and 8 as seen in FIG. 2 on which are secured clamps 9 and 10 by means of suitable fasteners such as the socket head screws 11. Grease fittings 12 may be provided in the slide bars 7 and 8 to lubricate the bearing surfaces between the bars and the slide 4. In the illustrated embodiment, there may be five such grease fittings in each slide bar.

Secured to one end of the base 3 in a centrally disposed stop bar 13 having mounted therein an adjusting screw 14 which has an adjusting knob 15 on the outer end thereof and a stop 16 on the inner end. A jam nut 17 is mounted on the adjusting screw adjacent the stop block 13.

A stop bar 18 is secured to the opposite end of the base 3 which also has mounted therein an adjusting stop screw 19 which may be rotated by the knob 20. In this manner, the slide engaging stop 21 on the inner end of the adjusting screw 19 may be precisely positioned. The upper end of the stop bar 18 is secured at 22 to the rod 23 of the piston-cylinder assembly 5.

As seen in FIG. 3, the slide 4 is provided with an elongated recess 25 at one end which straddles the stop bar 13 as the base 3 is moved back and forth along the slide. An elongated recess 26 is also provided at the opposite end of the slide straddling the stop bar 18. It can now be seen that movement of the base 3 along the slide 4 is obtained by the piston-cylinder assembly 5. When the assembly 5 is extended as seen in FIG. 1, the base 3 will be caused to move to the left along the slide 4 until the stop 16 engages the surface 27 of the recess 25. To return the slide to its original position, the assembly 5 will be retracted until the stop 21 engages the surface 28 of the recess 26. The slide 4 supporting the mounting base 3 for movement therealong may be supported by a suitable frame, not shown, above a platen on which the strip material S to be joined may be clamped. The slide in turn may be supported for indexing movement transversely across the strip material. Reference may be had to the aforementioned copending application for an illustration, especially in FIG. 2, of one type of C-frame which may be employed with the strip being clamped in the lower portion thereof.

Figure 5:
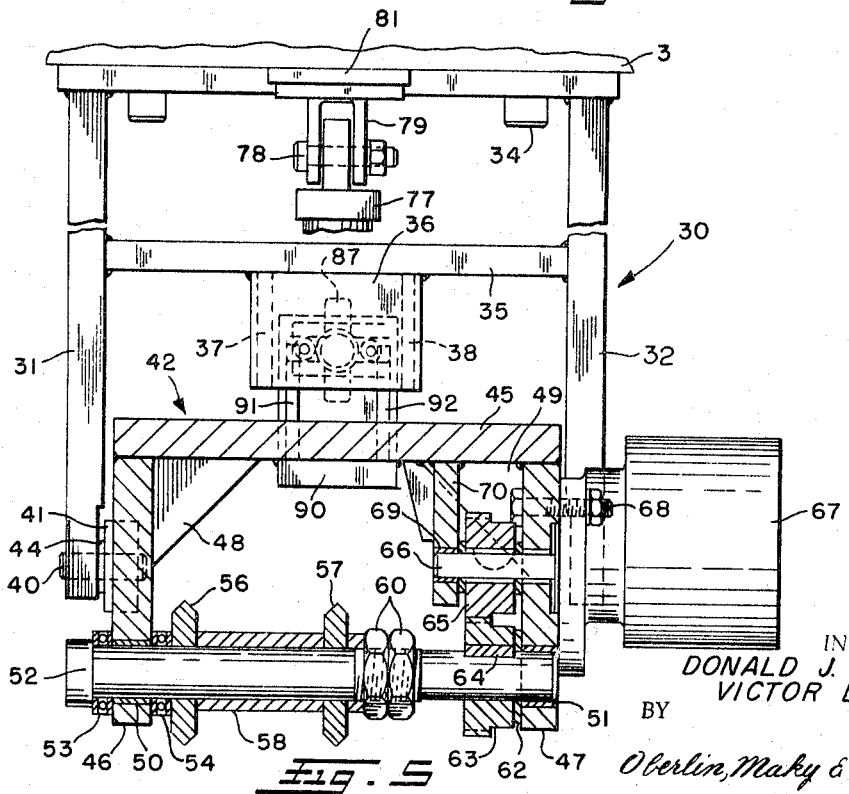
FIG. 5 is a fragmentary vertical section of such assembly as seen from the line 5—5 of FIG. 4.

Referring now additionally to FIGS. 4 and 5, there is shown in detail the cutter assembly which includes a frame 30 having downwardly projecting side members 31 and 32 with a top bridge plate 33 extending therebetween. Suitable fasteners 34 may be employed to secure the frame 30 to the underside of the base 3. An intermediate bridge plate 35 is also provided between the side members 31 and 32 and includes a downwardly projecting stop plate 36 provided with gussets 37 and 38 at the sides thereof rigidifying the same.

The downwardly projecting members 31 and 32 of the frame 30 are offset slightly inwardly as indicated in FIG. 4 and the distal ends of such members are provided with pivot pins 40 which are journalled in both the frame projections and rearwardly extending brackets 41 mounted on arbor housing 42. Thrust washers 44 may be interposed between the brackets and frame members and retaining rings may be employed to secure the pins in place in conventional manner.

The arbor frame 42 includes a top frame member 45 and side frame members 46 and 47 with rigidifying gussets being provided therebetween as shown at 48 and 49. The side frame members 46 and 47 are provided with bearings 50 and 51, respectively, in which the arbor 52 is journalled. Thrust bearings 53 and 54 are provided on the arbor on each side of the arbor frame member 46.

Secured to the arbor for rotation therewith are two angle cutters indicated at 56 and 57 with a spacer sleeve 58 interposed therebetween. A washer 59 and two jam nuts 60 are employed to stack and clamp the two cutters and the spacer on the arbor.

A thrust washer 62 is provided on the arbor interiorly of the frame member 47 and a spur gear 63 is keyed to the arbor as indicated at 64. A spur gear 65 is in mesh with the gear 63 and is mounted on the drive shaft 66 of hydraulic motor 67. The motor is secured to the arbor frame member 47 by suitable fasteners indicated at 68. The outboard end of the drive shaft 66 is journalled in bushing 69 in depending frame member 70 projecting downwardly from the top plate 45 of the arbor frame 42. Thrust washers may be interposed on each side of the drive gear 65. It can now be seen that the hydraulic motor 67 will drive the shaft 66 having the gear 65 mounted thereon in mesh with the gear 63 which will in turn drive the arbor 52 and the cutters 56 and 57.

As seen more clearly in FIG. 4, the front of the arbor frame 42 is provided with a bridge plate 72 extending between the frame members 46 and 47 from which extends a plate 73 having an aperture therein accommodating pin 74. The pin 74 extends through the clevis 75 on the rod 76 of hydraulic piston-cylinder assembly 77. The blind end of the assembly 77 is connected by pin 78 to clevis 79 secured by fasteners 80 through spacer 81 to the base 3. It can now be seen that retraction of the piston-cylinder assembly 77 will move the arbor frame 42 from the full line position shown in FIG. 4 to the phantom line position 83. Conversely, extension of the assembly 77 will move the arbor frame from its retracted phantom line position to its extended operating full line position about the axis of pins 40.

Such movement of the arbor frame to its operating position is limited by an adjusting screw 85 engaging stop pad 86 mounted on the stop plate 36 suspended beneath the bridge plate 35 of the frame 30. A knob 87 is provided on the outer end of the adjusting screw and a jam nut 88 is threaded thereon. The screw is threaded through upstanding plate 89 mounted on the end of extension plate 90 of the arbor frame 42. Gussets 91 and 92 may be welded between the normal plates 89 and 90 and the top plate 45 of the arbor housing to rigidify the rearward extension thereof. It can now be seen that the engagement of the stop screw 85 with the stop pad 86 will serve to limit the extension of the piston-cylinder assembly 77 and thus the position of the cutter wheels 56 and 57 with respect to the work. Adjustment of the stop screw 85, of course, controls the depth of the groove to be milled or cut in the ends of the workpieces to be joined.

The use of two cutters, of course, permits two grooves to be made in the ends of the clamped strip pieces to be joined in the same amount of time as one and also provides the arrangement for series welding hereinafter described. It will be readily appreciated that two, four or six or more cutters may be provided on the arbor shaft if desired.

After the grooves have been machined in the strip ends, the base 3 is indexed along the slide 4 to position the wire feed and weld assembly 2 in proper position above the machined grooves.

Referring now additionally to FIGS. 6, 7 and 8, it will be seen that the wire feed and weld assembly includes an electrode unit 94 and a wire feed assembly 95 with two wires W being fed from suitable spools through the latter to a position beneath the former for welding within the previously machined grooves. The wire feed assembly includes a frame 96 having a bottom plate 97, side plates 98 and 99, and a top plate 100. The top plate 100 may be secured to the base 3 by suitable fasteners 101 with a layer of insulation material 102 being interposed between the top plate and the base. The fasteners 101 may also be insulated from the top plate. Within each corner of the frame 96, there is provided a guide shaft 104 each of which is guided in vertically spaced bushings 105 and 106 and which are fastened by pins 107 to hubs 108 mounted on the top plate 109 of frame 110.

Also mounted within the frame 96 is a hydraulic piston-cylinder assembly 112 secured to the bottom plate 97 of the frame by suitable fasteners 113 and the rod 114 of such assembly projects through the plate 97 and is secured by fastener 115 to the top plate 109 of the frame 110. It can now be seen that the frame 110 may be raised and lowered at the direction of the hydraulic cylinder assembly 112 and that the four shafts 104 riding in the respective vertically spaced bushings 105 and 106 will guide the frame 110 in its vertical movement.

The frame 110 includes two inclined parallel legs 116 and 117, the lower ends of which will contact the clamped work as the frame 110 is lowered. As seen in FIG. 8, two shafts 119 and 120 extend between the legs 116 and 117 normal thereto and such shafts may be held in place by set screws shown at 121. Mounted on the shafts 119 and 120 is a wire feed index carriage 123. Such carriage comprises essentially a plate having a pair of blocks 124 and 125 welded to the opposite side edges thereof having bushings 126 therein through which the guide shafts 119 and 120 pass. Movement of the carriage 123 is obtained by a hydraulic piston-cylinder assembly 128, the rod 129 of which is secured by the bolt 130 to the leg 117 of the frame 110.

The extent of movement of the piston-cylinder assembly 128 and thus the carriage 123 in one direction is controlled by stop 131 mounted on an adjusting screw 132 threaded in hub 133 of the leg 116. A jam nut 134 is also threaded on the adjusting screw 132 and it can readily be seen that the position of the stop 131 controlled by the adjusting screw 132 will control the extent of movement of the piston-cylinder assembly 128 and thus the carriage 123. It is this extent of movement which controls the length of wire to be fed into the previously formed slots or grooves. Limitation of the movement of the carriage 123 in the other direction is controlled by stop screws 135 and 136 having stops on the inner ends thereof adapted to engage the plate 123.

The underside of the carriage 123 is provided with a front depending plate 138 having rearwardly extending wire guide bushings 139 mounted thereon. Just above the wire guide bushings 139, there is provided blocks 140 through which extend a dowel pin 141 and on which is mounted for limited pivoting movement a prenotch bar 143. The prenotch bar carries two knives 144 on the opposite sides thereof which are adapted to cooperate with rest buttons 145 mounted on the bottom member 146 of the rectangular frame 147 depending from the carriage 123. The stroke of the knives may be limited by a stop screw 146 seen in FIG. 8, the head of which will engage the underside of the prenotch bar 143.

Movement of the prenotch bar is obtained by a small hydraulic piston-cylinder assembly 148 pivotally mounted on trunnion mounting bracket 149 secured by fasteners 150 to the leg 117 of the frame 110. The rod 151 is connected to clevis 152 which is in turn connected by dowel pin 153 to the end of the prenotch bar 143. Thus, extension of the piston-cylinder assembly 148 will pivot the prenotch bar 143 about its proximal pivot 141 causing the blades 144 to move into engagement with the wires W to the extent limited by the screw 146.

Each of the wires W pass beneath nylon wire guides 155 and into bushings 156 in the leg 117 and then over the tops of the rest buttons 145 and into the guide bushings 139. The wires then pass beneath nylon wire guides 157 and into wire retainers 158 which are mounted for axial movement in the leg 116 and in the cut-off block 159 secured thereto by fasteners 160. The cut-off block 159 is provided with cylindrical recesses indicated at 161 and compression springs 162 bear against the flanged inner ends of wire retainers 158 urging them to their extended positions. However, when the carriage 123 moves thereagainst, the wire retainers 158 will be driven into the recesses 161 compressing the springs 162.

The wires W then pass through cut-off inserts 164 and extend beneath the electrodes 165 and 166. The electrodes are mounted in electrode adaptors 167 and 168, respectively, which are secured to the rods 169 and 170 of piston-cylinder assemblies 171 and 172. Such piston-cylinder assemblies may be of the dual piston pneumatic cylinder type and may be secured to the base 3 by suitable fasteners indicated at 173.

In operation, after the grooves have been placed in the ends of the material to be joined by the milling cutters 56 and 57 and the cutter assembly 1 is replaced by the wire feed and welding asembly 2 by the indexing of the base 3 along the slide 4, the frame 110 is lowered by means of the piston-cylinder assembly 112 until the legs 116 and 117 contact the work clamped to the bed of the machine. The piston-cylinder assembly 148 is then actuated pivoting the prenotch bar 143 to cause the blades 144 to place transverse grooves or notches in the wire in cooperation with the rest buttons 145. The piston-cylinder assembly 128 is then actuated to index the carriage 123 along the guide shafts 119 and 120 to feed the prenotches wires W through the cut-off block 159 into the premachined grooves. As the carriage 123 is indexed, the piston-cylinder assembly 148 will pivot about its trunnion mounting with the clevis on the end of the rod assuming the position indicated at 175 in phantom lines in FIG. 6. The knives 144 bite into the wire to form the prenotch therein and serve to grip the same to feed the wire through the cut-off box 159 to project beneath the electrodes into the premachined grooves as shown at 176. The electrodes 155 and 156, one positive and one negative, then descend as the result of the action of the piston-cylinder assemblies 171 and 172 cutting off the wires in cooperation with the cut-off inserts 164 and forcing them into the grooves. The prenotching of the wires facilitates the subsequent severing by the electrodes. The wires are then welded into such grooves with the current passing from one electrode to the other through the work.

When the wires are welded in place, the entire unit may then be shifted laterally to perform the groove machining and the wire welding operation at another point along the edges of the material to be joined and this operation may be repeated until the joint of desired strength is formed.

It can now be seen that hot rolled materials which will have scale or coated materials thereon, both of which would tend to form an insulation, may readily be joined with the machined groove and series welding operation since such insulation material will be cleanly removed and will not affect current flow. Moreover, the added impedance problem encountered with wide strip materials is not present with the series welding from one electrode to the other and the substantial k.v.a. drop normally encountered by this problem is not present. Accordingly, less current is required since no increased compensatory current is required.

It can now be seen that there is provided an improved strip joining method and apparatus wherein grooves of precise depth and configuration may be placed in the ends of the strip to be joined and then wire may be fed quickly and conveniently into such grooves to be welded therein by a series welding operation. Moreover, the prenotching of the wires not only facilitates the uniform and precise feeding of the wires but also aids in the subsequent severing of the wire as the electrodes descend thereon.

Other modes of applying the principle of the invention may be employed, change being made as regards the details described, provided the features stated in any of the following claims or the equivalent of such be employed.

We, therefore, particularly point out and distinctly claim as our invention:

1. In a stitcher for joining metal strips and the like, a slide, a base, means mounting said base on said slide for indexing therealong, a groove cutting assembly mounted on said base, a wire feeding and welding assembly mounted on said base, and means operative to index said base along said slide to replace said cutting assembly by said welding assembly vis-a-vis such groove.

2. A stitcher as set forth in claim 1 wherein said groove cutting assembly includes a pair of laterally spaced cutters, said wire feeding and welding assembly including means to feed a pair of wires into the grooves formed by said cutters and a pair of electrodes to pass welding current from the wire in one groove to the wire in the other.

3. A stitcher as set forth in claim 1 wherein said groove cutting assembly and said wire feeding and welding assembly are mounted on said base for vertical movement toward and away from the work.

4. A stitcher as set forth in claim 1 wherein said means operative to index said base comprises a piston-cylinder assembly on said slide and connected to said base, and means operative closely to control the extent of movement of said base in both directions.

5. In a stitcher for joining strip ends, a cutter assembly comprising a pair of laterally spaced rotary cutters, means operative to feed said cutters into such strip ends to place a pair of machined grooves therein extending from one strip end to the other, a wire feed and welding assembly, means operative to index said welding assembly with respect to such strip ends to place said welding assembly in registry with the pair of machined grooves; said welding assembly including means to feed wires into such grooves, and a pair of vertically movable electrodes operative to descend over such wires within such grooves and weld the same therein.

6. A stitcher as set forth in claim 5 wherein said means to feed wires within such grooves comprises an index carriage, a prenotch blade for each wire mounted on said carriage, means operative to drive each prenotch blade into such wires a predetermined distance, and means operative to index said carriage while each blade engages such wires.

7. A stitcher as set forth in claim 6 including means to release said blades from such wires and to return said carriage to its original position.

8. A stitcher as set forth in claim 5 wherein said cutters are mounted on an arbor journalled in a pivotally mounted housing, and a hydraulic piston-cylinder assembly operative to pivot said housing to feed said cutters into such work.

9. A stitcher as set forth in claim 8 including an adjustable stop means on said housing operative to limit pivoting movement thereof to control the depth of the grooves placed in such work.

10. A stitcher as set forth in claim 8 including a hydraulic motor on said housing operative to rotate said arbor and thus said cutters.

11. A stitcher as set forth in claim 5 wherein said wire feed and welding assembly includes means operative to prenotch such wires as they are fed beneath said electrodes, and means operative to sever such prenotched wires as said electrodes descend.

12. A wire feed and welding assembly for a strip stitcher comprising a vertically movable electrode, a wire feed index carriage operative to feed a wire beneath said electrode, a prenotch blade for such wire mounted on said carriage, means operative to drive said prenotch blade into such wire a predetermined distance, and means operative to index said carriage axially of such wire while said blade engages such wire.

13. An assembly as set forth in claim 12 including means operative to release said blade from such wire prior to the return of said carriage.

14. The method of joining two strip elements comprising the steps of cutting a pair of grooves in such elements extending from one to the other, feeding coextensive wires in each groove beneath welding electrodes by indenting such wires and indexing the apparatus which indents the wires axially of such wires, and series welding such wires in such grooves by passing current from the wire in one groove to the wire in the other groove while simultaneously severing such wires to substantially the length of such grooves.

References Cited

UNITED STATES PATENTS

| 1,038,604 | 9/1912 | Lachman | 219—106 |
| 1,040,418 | 10/1912 | Rietzel | 219—106 |
| 1,531,824 | 3/1925 | Smith | 219—61 |
| 1,756,403 | 4/1930 | Thomson | 219—67 X |
| 1,930,263 | 10/1933 | Burnish | 219—67 X |
| 2,338,467 | 1/1944 | Tench | 219—94 X |
| 2,817,981 | 12/1957 | Brownell | 219—94 X |

FOREIGN PATENTS

| 196,137 | 4/1923 | Great Britain. |

RICHARD M. WOOD, *Primary Examiner.*

B. A. STEIN, *Assistant Examiner.*

U.S. Cl. X.R.

219—106